United States Patent Office 3,127,161
Patented Mar. 31, 1964

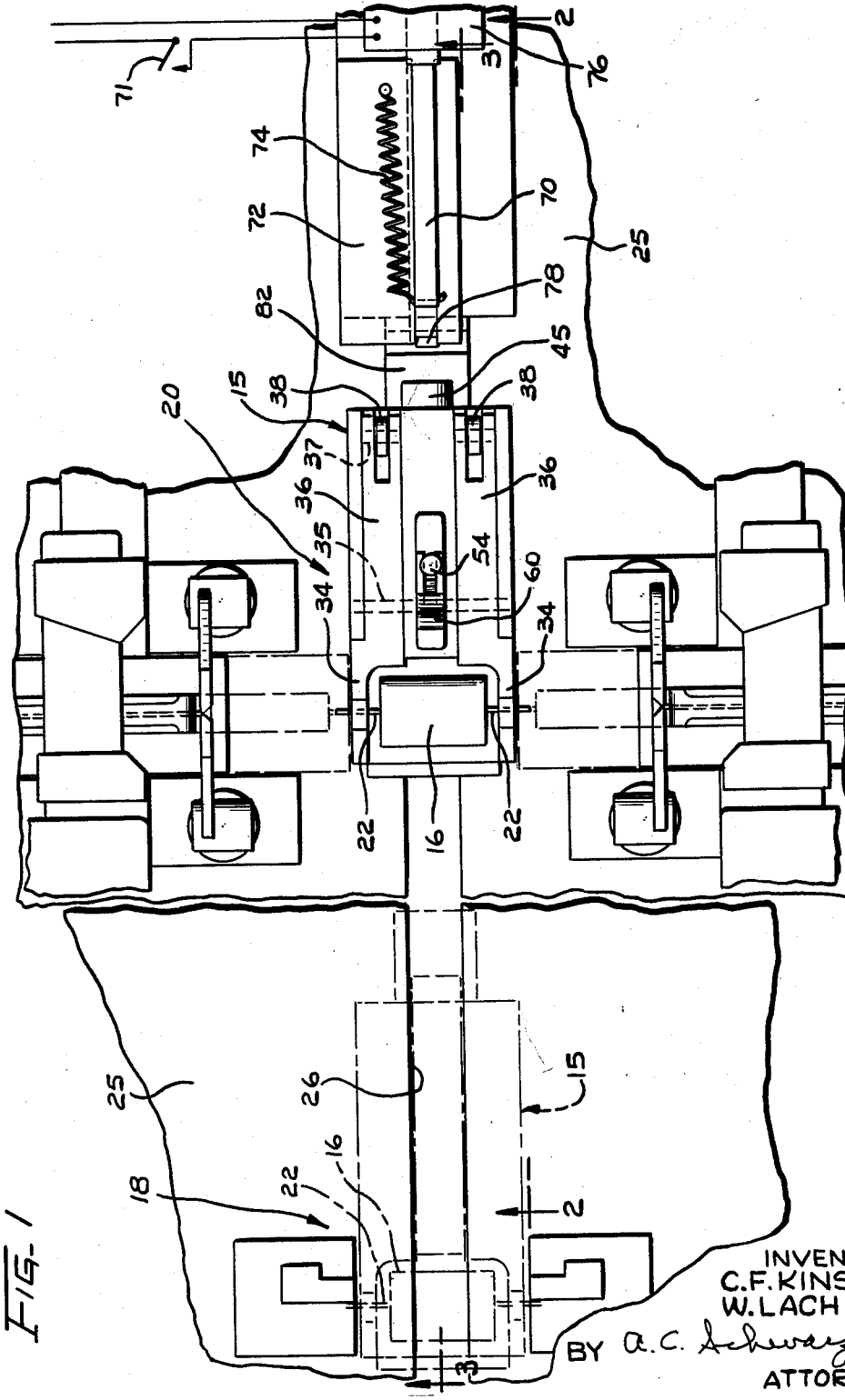

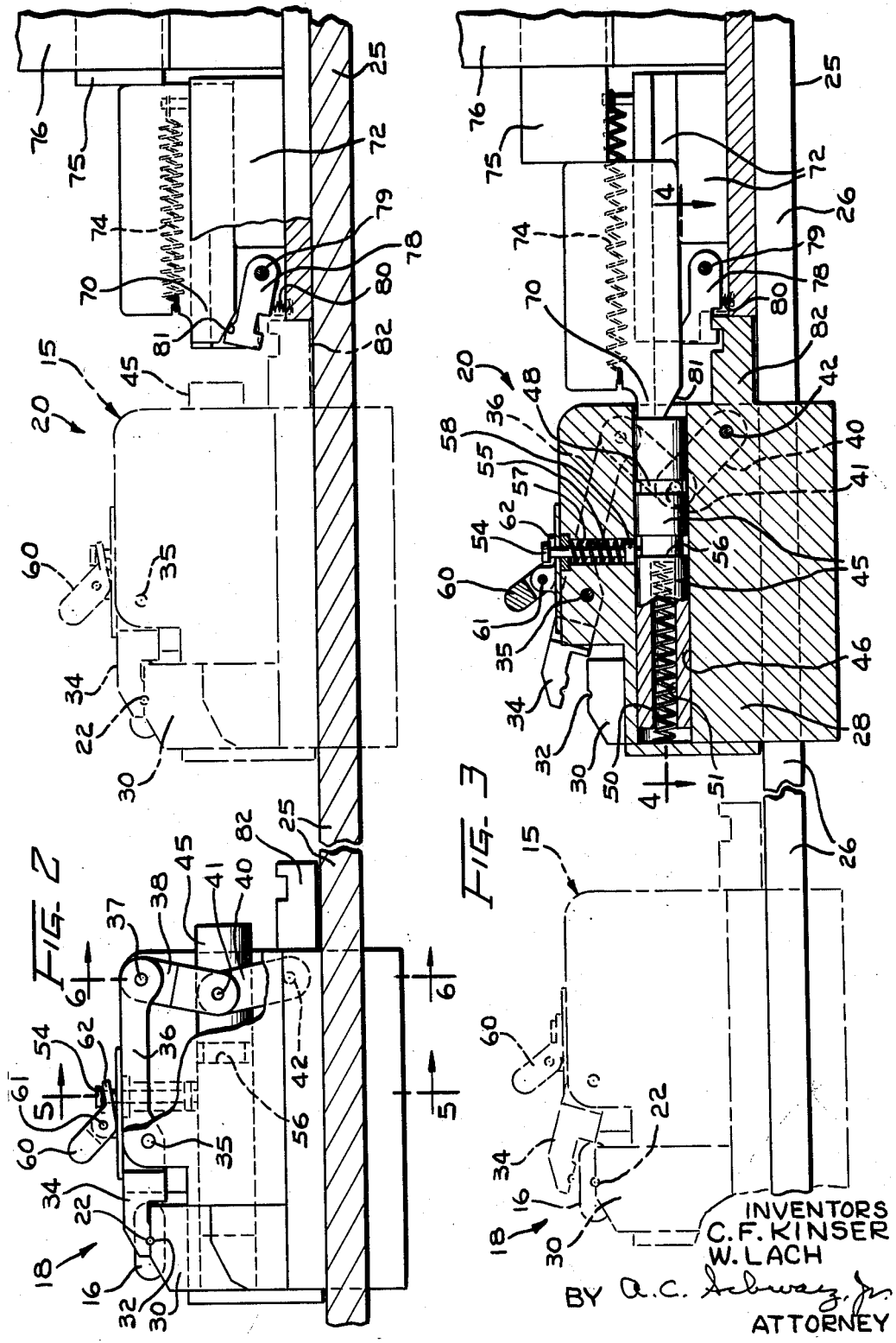

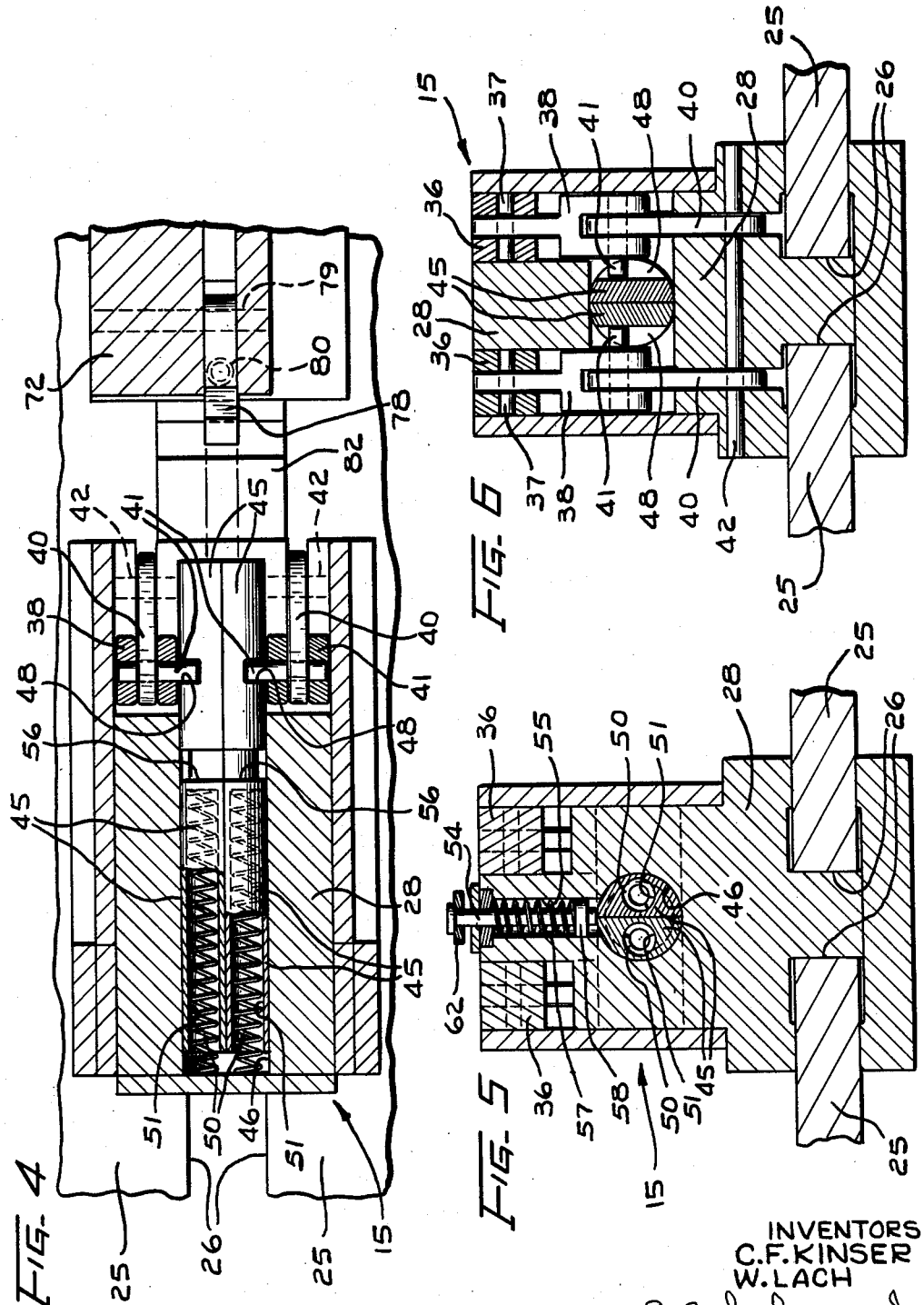

3,127,161
ARTICLE HOLDING AND MOVING DEVICE
Charles F. Kinser, Downers Grove, and Walter Lach, Chicago, Ill., assignors to Western Electric Company, Incorporated, New York, N.Y., a corporation of New York
Filed July 6, 1962, Ser. No. 208,000
3 Claims. (Cl. 269—56)

This invention relates to an article holding and moving device, and more particularly to a device for readily gripping and releasing an article and for supporting it for movement from one station to another.

An object of the present invention is to provide a device for readily gripping and holding an article for movement from one station to another and for readily releasing the article.

A device illustrating certain aspects of the invention may include a holder mounted for movement from one station to another and provided with a pair of seats for supporting the article at spaced points thereon. A pair of jaws is mounted on the holder for pivotal movement from an open position to a closed position for gripping the articles against the seats. Movement to the jaws is imparted by mechanism including a pair of toggle joints, the extremities of each pair of which are pivotally connected to the holder and to one of the jaws, and the intermediate knee portion of which is operatively connected to one of a pair of plungers. The plungers are individually mounted on the holder in side-by-side relation for reciprocatory movement and are spring stressed individually for movement in one direction from normal retracted positions to effect the actuation of the jaws from open to closed positions. A reciprocatory element mounted adjacent to one of the work stations is actuatable to move the plungers to the retracted position and effect the movement of the jaws to open position. A member which automatically latches the holder in retracted position is manually actuated to effect the release of the plungers and the movement of the jaws to closed position.

Other objects, advantages and novel aspects of the invention will become apparent upon consideration of the following detailed description, in conjunction with the accompanying drawings, in which:

FIG. 1 is a fragmentary plan view of an apparatus embodying the present article holding device shown in dotted lines at a first work station and shown in full lines at a second station;

FIG. 2 is a fragmentary vertical longitudinal sectional view of the apparatus taken on the line 2—2 of FIG. 1 and showing the holder in the first station in full lines and in the second station in dotted lines and showing the article holding jaws in closed position;

FIG. 3 is a fragmentary vertical longitudinal sectional view of the apparatus taken on the line 3—3 of FIG. 1 and showing the holder in full lines in the second station with the jaws open and showing the holder in dotted lines in the first station with the jaws open;

FIG. 4 is an enlarged horizontal sectional view through the holder taken along line 4—4 of FIG. 3; and FIGS. 5 and 6 are enlarged fragmentary cross-sectional views through the holder taken along the lines 5—5 and 6—6, respectively, of FIG. 2.

Referring to the drawings, the invention comprises a holder 15 for releasably supporting an article 16 in a predetermined position thereon at a first work station 18 of a welding apparatus and for movement therewith to a second work station 20. As shown herein (FIGS. 1–3), the article 16 is a capacitor having a pair of leads 22 extending from opposite ends thereof, portions of which are damaged and are severed from the capacitor at station 18, after which the holder and the capacitor 16 are moved to the station 20 where extension leads are welded to the stub leads on the capacitor. The mechanisms at the stations 18 and 20 are supported on a horizontal frame plate 25 which also supports the holder 15 for sliding movement along a slotted track 26 from one station to the other.

The holder 15 comprises a block-like body 28 having a pair of laterally spaced upwardly directed fixed jaws 30, the upper surfaces of which form seats for supporting the article 16 thereon. Grooves 32 are provided in the upper portion of the jaws 30 for locating and supporting the leads 22 in a predetermined position on the holder. A pair of movable jaws 34 are mounted on the holder 15 for rocking movement about a fixed pivot pin 35 to clamp the leads 22 against the jaws 30 to secure the article 16 to the holder. Extending horizontally from each of the movable jaws 34, as viewed in FIG. 2, is an arm 36 that is pivotally connected at 37 to a first link 38 of a toggle joint. A second link 40 is connected at one end to the first link by a pin 41 and is pivotally connected at its other end to the block 28 for movement about a pin 42 on the holder. Movement of the jaw 34 to and from open and closed position is effected through the actuation of the toggle joint to and from its straightened and bent positions as shown in FIGS. 2 and 3, respectively.

Movement of the toggle joints in turn is effected by mechanism including a plunger 45 for each of the pair of toggle joints and the jaw 34 associated therewith. The two plungers 45 are of semi-circular cross-section and are mounted individually for movement in a horizontal bore 46 in the body 28 of the holder 15 and each plunger is provided with a vertically directed slot 48 (FIGS. 3 and 4) for receiving an end portion of the pin 41 at the knee of the toggle joint. Springs 50 disposed in longitudinal recesses in the plungers 45 urge the plungers to the right, as viewed in FIGS. 2 and 3, to effect the straightening of the toggle joints and the movement of the jaws 34 to closed position to clamp the article 16 to the holder 15. With the provision of separate plungers 45 individual to the movable jaws 34, tight gripping of each of the leads between the jaws 30 and 34 is assured even though slight variations in the thickness of the leads 22 may occur.

Mechanism including a latch 54 (FIG. 3) is provided for releasably retaining the plungers 45 in a retracted position and the movable jaws 34 in their open position. As shown to best advantage in FIG. 5, the latch 54 is in the form of a rod which is mounted for vertical movement in an aperture 55 with the lower end of the latch engageable in annular grooves 56 in the plungers 45. The latch 54 is urged downwardly by a spring 57 engaging an annular shoulder 58 on the latch 54 (also see FIGS. 3 and 5), and the latch is adapted to be moved upwardly to release the plungers by a trip lever 60. The lever 60 is pivotally supported on a pin 61 carried by the holder 15 and has a bifurcated end 62 engaging the underside of an enlarged head on the upper end of the latch.

At station 20 mechanism including a ram 70 is provided for moving the plungers 45 to their retracted position and the jaws 34 to their open position (FIG. 3). The ram 70 is slidably supported in a fixed guide 72 for horizontal movement in alignment with the plungers 45 and is urged by a spring 74 to a normal retracted position (FIG. 2) in engagement with a plunger 75 of a solenoid 76. The solenoid which is fixedly mounted on the frame plate 25 is connected to a source of power and may be energized by closing a switch 71 (FIG. 1) in response to which the ram 70 is advanced and the reduced forward end thereof engages both plungers 45 and returns them to their retracted position. The latch 54 thereupon drops into the annular grooves 56 and retains the plungers in the retracted position.

During the return movement of the plungers 45 by the ram 70, the holder 15 is locked against movement therewith by a hook-shaped holding pawl or latch 78 which is mounted for pivotal movement about a fixed pin 79 on the guide 72. The holding pawl is urged upwardly by a spring 80 to a normal inoperative position (FIG. 2) in engagement with an inclined cam surface 81 on the forward portion of the ram 70. As the ram 70 advances, it rocks the holding pawl 78 downwardly to cause the hooked end thereof to engage the hooked end of an extension 82 of the holder 15 to lock the holder against movement prior to the engagement of the ram 70 with the plungers 45 and during the movement of the plungers to the retracted position. Upon completion of the actuation of the plungers 45 to the retracted position and as the ram 70 returns to its normal retracted position, the inclined surface 81 thereon permits the upward movement of the holding pawl 78 by the spring 80 and the disengagement of the pawl from the holder 15. The end portion of the fixed guide 72 on the frame plate 25 is engaged by the extension 82 of the holder 15 and serves to locate the holder and the article 16 in a predetermined position at the work station 20.

Operation

In the operation of the device, with the holder located at station 18 and with the jaws 34 in open position, as indicated in dotted lines in FIG. 3, an article 16 is placed in the holder with the leads 22 resting in the grooves 32 of the fixed jaws 30. The trip lever 60 is then actuated manually to raise the latch 54 and effect the release of the plungers 45 resulting in the actuation of the toggle joints through the action of the springs 50 and the movement of the movable jaws 34 to closed position to clamp the capacitor 16 to the holder 15. After the leads of the capacitor 16 have been trimmed to a predetermined size at the first station 18, the holder 15 is moved to the second station and a pair of extension leads are welded to the stub leads of the capacitor. Thereafter, the switch 71 is closed to effect the energization of the solenoid 76 and the advancement of the ram 70 resulting in the temporary locking against movement of the holder 15 by the holding pawl 78, the return movement of the plungers 45 to their retracted position where they are held by the latches 54, and the actuation of the movable jaws 34 to their open positions. The ram 70 is then retracted and the holding pawl 78 is disengaged from locking engagement with the holder 15.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. In a device of the type described:
a holder having a seat for supporting an article thereon;
mounting means for supporting said holder for movement to and from a work position;
a jaw mounted on said holder for pivotal movement from an open position to a closed position to grip the article against said seat;
a plunger mounted on said holder for reciprocatory movement;
a toggle joint having an intermediate knee portion operatively connected to said plunger for actuation thereby and having outer extremities pivotally connected to said holder and said movable jaw;
resilient means for urging said plunger in one direction from a retracted position to effect the movement of said toggle joint from a bent condition toward a straightened condition and the actuation of said jaw to closed position;
an element movably supported on said mounting means adjacent to the work position for engagement with said plunger;
means for advancing said element to effect the movement of said plunger to retracted position and the actuation of said jaw to open position;
means on said holder operable in response to movement of said plunger to the retracted position for latching said plunger in such position;
means for actuating said latching means to effect the release of said plunger and the actuation of said movable jaw to closed position; and
means on said mounting means operable in response to actuation of said element for latching said holder against movement during the movement of said plunger to retracted position.

2. In a device of the type described:
a holder having a seat for supporting an article thereon;
mounting means for supporting said holder for movement to and from a work position;
a jaw mounted on said holder for pivotal movement from an open position to a closed position to grip the article against said seat;
a plunger mounted on said holder for reciprocatory movement;
a toggle joint having an intermediate knee portion operatively connected to said plunger for actuation thereby and having outer extremities pivotally connected to said holder and said movable jaw;
resilient means for urging said plunger in one direction from a retracted position to effect the actuation of said jaw to closed position;
an element movably supported on said mounting means adjacent to the work position for engagement with said plunger;
means for advancing said element to effect the movement of said plunger to retracted position and the actuation of said jaw to open position;
means on said holder for latching said plunger in the retracted position;
means for actuating said latching means to effect the release of said plunger and the movement of said jaw to closed position; and
a latch pivotally supported on said mounting means in a normal inoperative position in the path of movement of said element for actuation by said element to an operative position in locking engagement with said holder for latching said holder against movement while said plunger is being returned to the retracted position.

3. In a device of the type described:
a holder mounted for movement along a predetermined path to and from a work station and having a pair of spaced seats for supporting an article thereon;
a pair of jaws pivotally mounted on said holder for gripping the article at spaced points against said seats;
two pair of toggle links, the links of each pair being pivotally connected at their outer extremities to said holder and one of said jaws and having an actuating pin for pivotally interconnecting the inner extremities thereof;
a pair of plungers mounted in side-by-side relation to each other for longitudinal movement individually on said holder and each having a recess for receiving one of said actuating pins;
resilient means individual to said plungers to urge said plungers in one direction to effect the movement of said pairs of toggle links toward a straight condition and the actuation of said jaw associated therewith to a closed position;
a ram mounted at said station for movement into engagement with said plungers when said holder is at said station;
means for actuating said ram to effect the movement of said plungers to a retracted position;

means responsive to the actuation of said ram for holding said holder against movement while said plungers are being moved to retracted positions;

means on said holder responsive to the movement of said plungers to retracted position for latching said plungers; and means for actuating said latching means to release said plungers and effect the movement thereof and the actuation of said jaws to closed position.

References Cited in the file of this patent

UNITED STATES PATENTS

| | | |
|---|---|---|
| 233,672 | Haley | Oct. 26, 1880 |
| 701,167 | Dennis | May 27, 1902 |
| 771,097 | Ritts | Sept. 27, 1904 |
| 1,004,260 | Higbee | Sept. 26, 1911 |
| 2,269,754 | Bernhardt et al. | Jan. 13, 1942 |